United States Patent [19]

Kokubu et al.

[11] Patent Number: 4,933,034
[45] Date of Patent: Jun. 12, 1990

[54] BEAD APPEX APPLYING METHOD AND DEVICE

[75] Inventors: Satoru Kokubu, Fukushima; Susumu Ito, Shirakawa; Susumu Suga, Fukushima; Kazuo Sato, Kobe, all of Japan

[73] Assignee: Sumitomo Rubber Industries, Limited, Japan

[21] Appl. No.: 243,866

[22] Filed: Sep. 13, 1988

[30] Foreign Application Priority Data

Oct. 30, 1987 [JP] Japan .................................. 62-249039

[51] Int. Cl.$^5$ ............................................. B29D 30/48
[52] U.S. Cl. .................................... 156/136; 156/398; 156/422; 156/460
[58] Field of Search ................ 156/136, 398, 422, 460

[56] References Cited

U.S. PATENT DOCUMENTS 4,354,892 10/1982 Tarantola et al. ................... 156/398
4,410,389 10/1983 Cole et al. ....................... 156/136 X

FOREIGN PATENT DOCUMENTS 51-29551 12/1973 Japan .
61-6782 7/1979 Japan .
58-126139 7/1983 Japan .................................. 156/136

Primary Examiner—Raymond Hoch
Attorney, Agent, or Firm—Fidelman & Wolffe

[57] ABSTRACT

In manufacture of an automobile tire, a method and a device for making a bead apex/bead ring assembly. More particularly, a method and a device for automatically applying an extruded belt-like rubber material generally referred to as "bead apex" or "bead filler" onto a core material referred to as "bead ring" which is previously mounted on a circular holding device referred to as "former" to make a bead ring/bead apex assembly. In the proposed method and device, the "apex" is drawn out from an extruder or a roll and fed to the "bead ring" and, then it is wound around and bonded to the outer periphery of the "bead ring" with rotation of the "former", and at least the leading end of the apex is caught and restrained by a holding device during at least a period from the start to the end of the apex applying process.

18 Claims, 9 Drawing Sheets

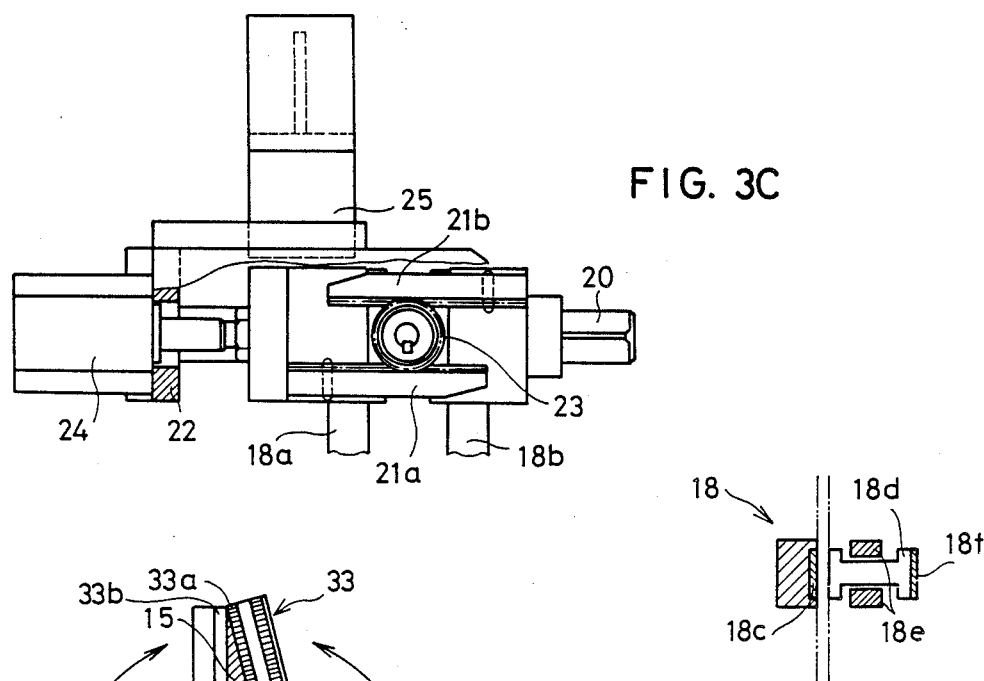
FIG. 3C
FIG. 3D
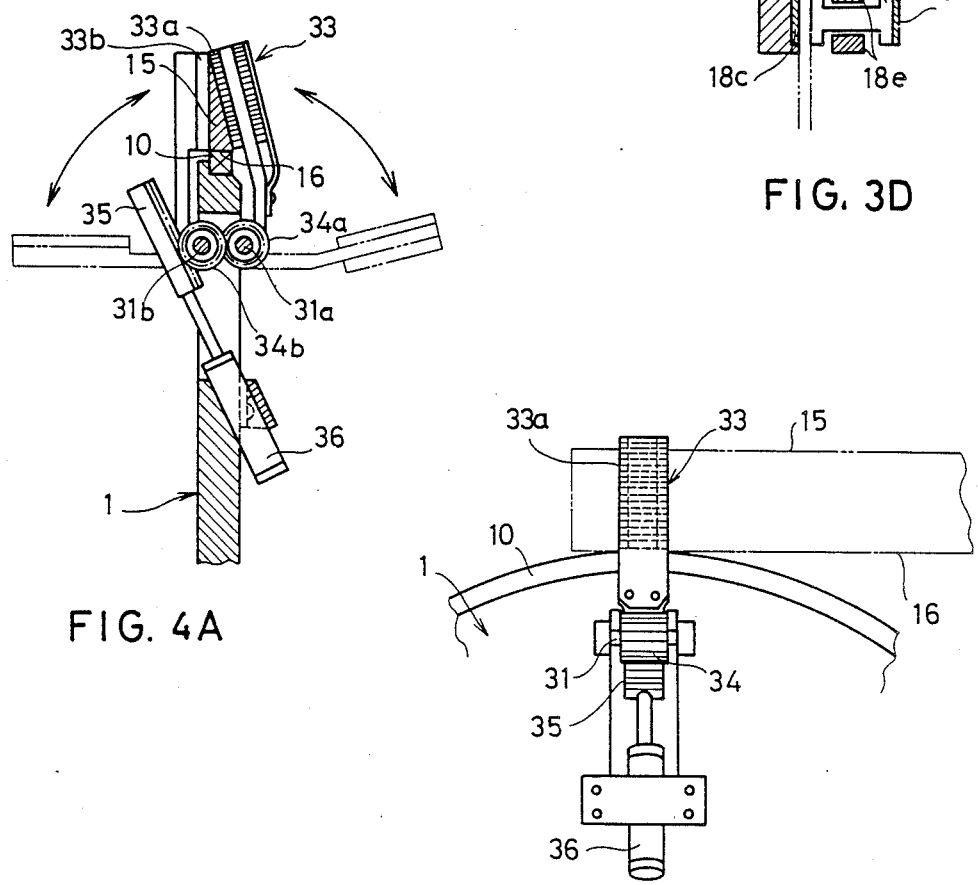
FIG. 4A
FIG. 4B

BEAD APEX APPLYING METHOD AND DEVICE

BACKGROUND OF THE INVENTION

This invention relates to a method of annularly applying a rubber layer, so-called bead apex or bead filler, which is formed by extrusion to have a relatively slender and substantially triangular cross-section, to the peripheral surface of a bead ring for an automobile tire prior to the application of the bead ring with a bead apex to the tire building former in tire manufacture and a device for realizing this method.

Principal prior art techniques of this kind are disclosed, for example, in Japanese patent publication gazette Nos. 51-29551 and 61-6782. It is described, in the former, that the leading end of an apex is fed onto a rotating bead ring suspended between a pair of guide rollers and continously pressed against the peripheral surface of the bead ring by a pair of press rollers to be applied annularly thereto, that the bead apex is pinched between a disc roller and a cone roller so as to forcibly stretch it from the inner edge to the outer edge during the apex applying process, that arrival of the leading end of the apex at a predetermined position is detected and the bead apex is cut in a predetermined length at the tail end thereof, that both cut ends of the apex which are left open in V-shape are clamped and drawn into contact by a splicing mechanism to bond both cut ends together after the apex is applied to the whole peripheral surface of the bead ring, and so on.

It is described, in the latter, that a bead ring is held on the periphery of a rotatable disc and a bead apex previously cut in a predetermined length is annularly applied to the peripheral surface of the bead ring with rotation of the disc, and that, when both ends of the bead apex face to form a V-shaped gap therebetween, both ends are caught from respective side surfaces by two pairs of catching members (pressing elements) and a thrust force is applied to the catching members by a third mechanism, thereby drawing near both the V-shaped facing ends until they butt against each other to be bonded together.

When a bead apex having a relatively slender triangular cross-section is applied annularly to a bead ring, a V-shaped gap is unavoidably formed between the leading and tail ends of the apex due to the difference between the inner and outer circumferential lengths of the annular bead apex lying on the peripheral surface of the bead ring. According to the above-mentioned prior art techniques, both ends of the bead apex are caught by pincers-type catching members and mutually drawn near to make a butt joint after the bead apex is applied to the peripheral surface of the bead ring. However, this has given rise to such problems in that the bead apex contracts especially in its outer edge region in the period from the drawing out of the bead apex to the completion of the application of the bead apex to the bead ring and, therefore, the V-shaped gap expands more by the amount corresponding to this contraction, that the apex is locally deformed in the vicinity of the joint in order to remove the V-shaped gap and this local deformation results in a corresponding local irregularity of the peripheral shape of the bead apex, and that undesirable catching marks of the catching members may remain in and near the joint. The size of the V-shaped gap is not always fixed and it is sometimes large and sometimes small, since the degree of contraction of the bead apex rubber varies with its viscosity. The above-mentioned pincers-type catching members of the prior art cannot effect a free drawing motion conformable to the size of the V-shaped gap but a limited motion only. More particularly, if the operation stroke is set large for avoiding misjoint, an over-joint (excessive bond) may be resulted from bonding or a small gap. Inversely, if the operation stroke is set small in accordance with a small gap, an insufficient joint including residual openings may be resulted from bonding of a large gap.

SUMMARY OF THE INVENTION

Accordingly, an object of this invention is to provide an improved bead apex applying method eliminating the above-mentioned problems of the prior art techniques.

Another object of this invention is to provide an improved bead apex applying device for realizing this method.

The bead apex applying method according to this invention comprises the steps of drawing the leading end of a belt-like apex having a substantially triangular cross-section to a position above a rotatably supported bead ring, pressing it against the peripheral surface of the bead ring, then rotating the bead ring to successively apply the apex in annular fashion to the outer peripheral surface of the bead ring, stopping rotation and cutting the bead apex in a predetermined length when the leading end attains a predetermined angle of rotation, resuming rotation of the bead ring to apply the remaining part of the bead apex to the remaining outer peripheral surface of the bead ring and mutually joining the cut surfaces of both leading and tail ends to complete a bead apex applying process, and is characterized in that at least the leading end of the apex is caught and restrained by a holding device during at least a period extending from the start to the end of the bead apex applying process.

The bead apex applying device according to this invention comprises a bead ring, a guide device for guiding the belt-like bead apex to be drawn out to a position above the bead ring, a bead apex pressing device for pressing the bead apex against the outer peripheral surface of the bead ring and a cutting device for cutting the bead apex in a predetermined length when the leading end of the bead apex attains a predetermined angle of rotation, thereby the belt-like apex is applied annularly onto the outer peripheral surface of a bead ring by the rotation of the bead ring, the bead ring holding device being composed of a rotatably supported annular former which can support the bead ring on its periphery and provided with a holding device having a catching unit supported by the former for catching and restraining the leading end of the bead apex and maintaining the catching and restraining state throughout a period extending from the start to the end of the bead apex applying process.

According to this invention, it is arranged that the leading end of the bead apex is continually caught and restrained by the holding device throughout at least a period from the start to the end of the bead apex applying process or a period from the drawing out of the bead apex to a position above the bead ring to the end of the bead apex applying process, and the tail end of the bead apex is also continually caught and restrained by the holding device during a period from the cutting of the bead apex to the end of the bead apex applying process. Therefore, in contrast to the above-mentioned prior art techniques, the bead apex, especially its outer peripheral edge (knife edge) region, is stretched by and large and uniformly over its circumference during one rotation of the bead ring with no affection of the rubber contraction and the bead apex height. Such stretching of the outer periheral edge region, as a whole, of the bead apex preferably results in a uniform force for press-fitting the inner circumferential surface of the bead apex to the outer peripheral surface of the bead ring.

The above-mentioned restraint of the leading and tail ends of the bead apex throughout the bead apex applying process counteracts to the increase in size of the outer peripheral edge region when the bead apex is bent along the outer peripheral surface of the bead ring to result in an elongation. However, this elongation grows gradually with ease as the bead apex is bent from the leading end along the bead ring, and becomes uniform all over the circumference as described above. This results in a much smaller V-shaped gap at the end joint of the bead apex as compared with that of the prior art and, accordingly, the degree of deformation of the joint region due to the stretching action is substantially reduced.

These and other objects and features of this invention will be described in more detail with reference to the accompanying drawings.

BRIEF DESCRIPTION OF DRAWINGS

In the Drawings:

FIG. 3C is a plan view representing the part of FIG. 3A;

FIG. 3D is a sectional view along the line S3—S3 of FIG. 3B;

FIG. 4A is an enlarged sectional side view representing a second holding device of the embodiment of FIG. 1;

FIG. 4B is an enlarged front view representing part of the device of FIG. 4A;

Throughout the drawings, the same reference numerals are given to corresponding structural components.

DESCRIPTION OF PREFERRED EMBODIMENT

Figure 1:
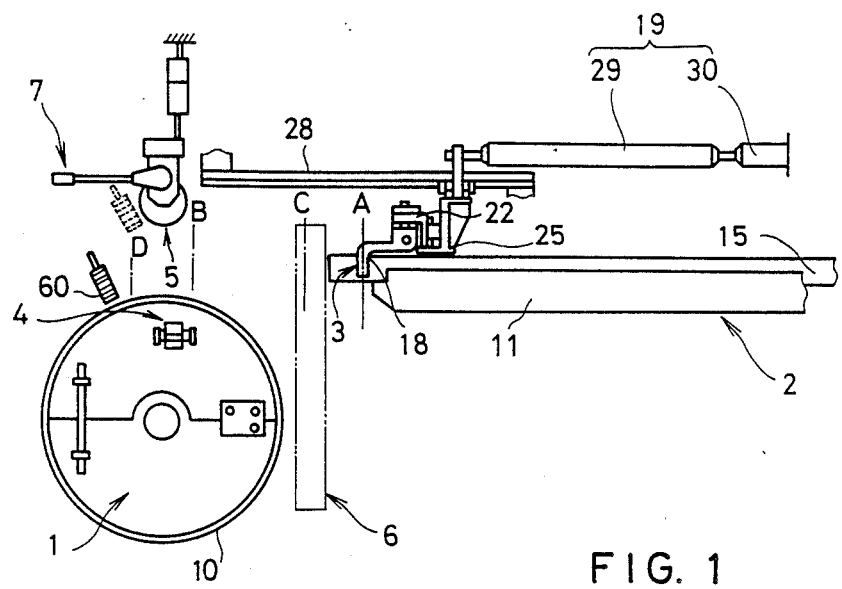
FIG. 1 is a front view representing an embodiment of the bead apex applying device according to this invention.

An embodiment of this invention will be described with reference to FIGS. 1 to 11. The drawings show a scheme of the device used for realizing the method of this invention and composed of a former 1, an bead apex guide device 2, a first holding device 3, a second holding device 4, a bead apex pressing device 5, a cutting device 6 and a joint pressing device 7.

As shown in FIG. 1, the former 1 is formed in annular shape with a width sufficient for supporting an annular bead ring 10 on its periphery in contact with the inner circumference of the bead ring and supported by a shaft on a machine frame (not shown) in cantilever fashion so as to be driven rotatably by a motor. The angle of rotation is controlled by an encoder. The outer diameter of the former 1 may be made changeable so as to be conformable with the inner diameter of the bead ring. Such diameter adjusting mechanism can be realized by utilizing known link or air-bag systems.

Figure 2A:
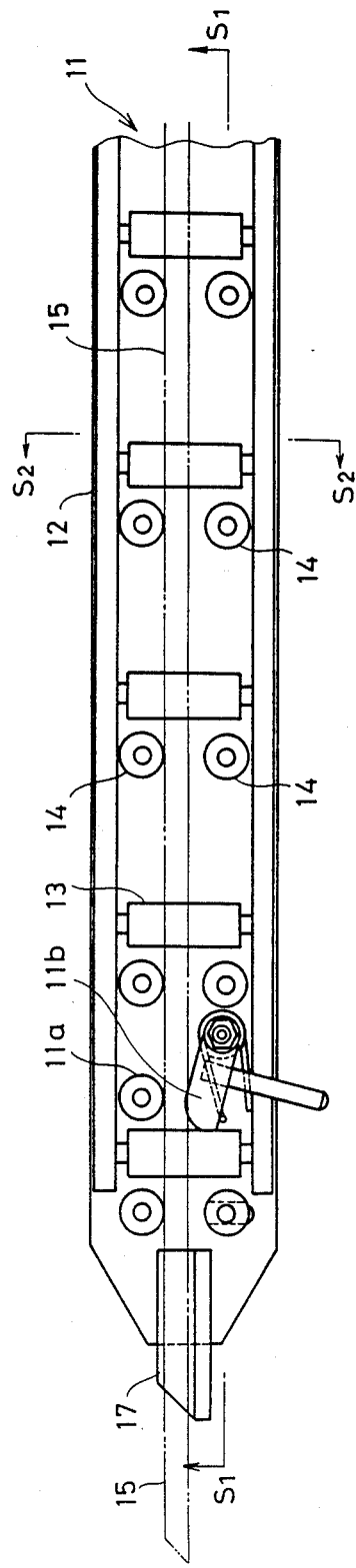
FIG. 2A is an enlarged plan view representing part of an bead apex guide of the embodiment of FIG. 1.
Figure 2B:
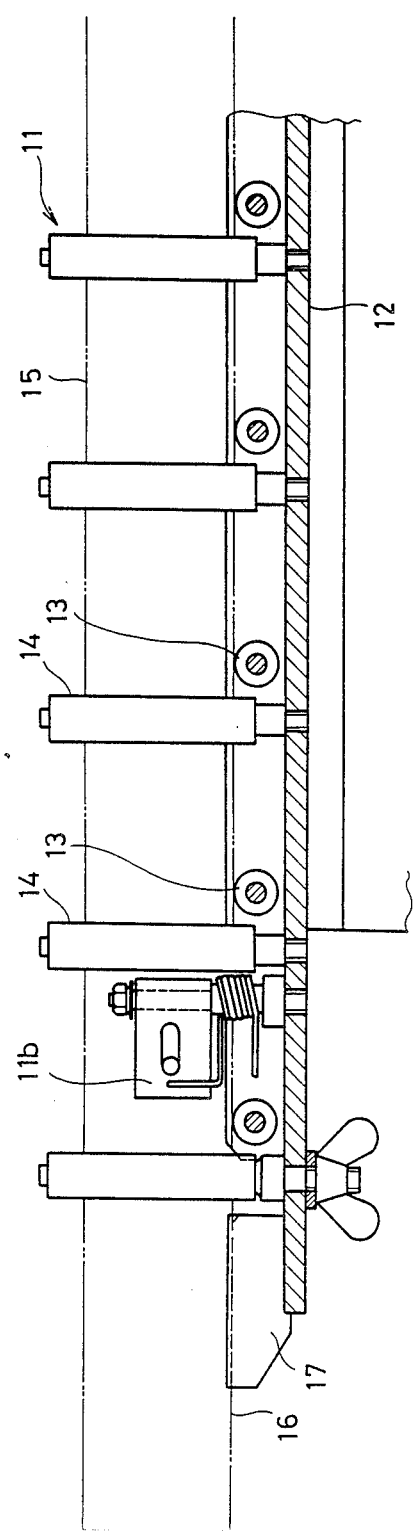
FIG. 2B is a sectional side view along the line S1—S1 of FIG. 2A.
Figure 3A:
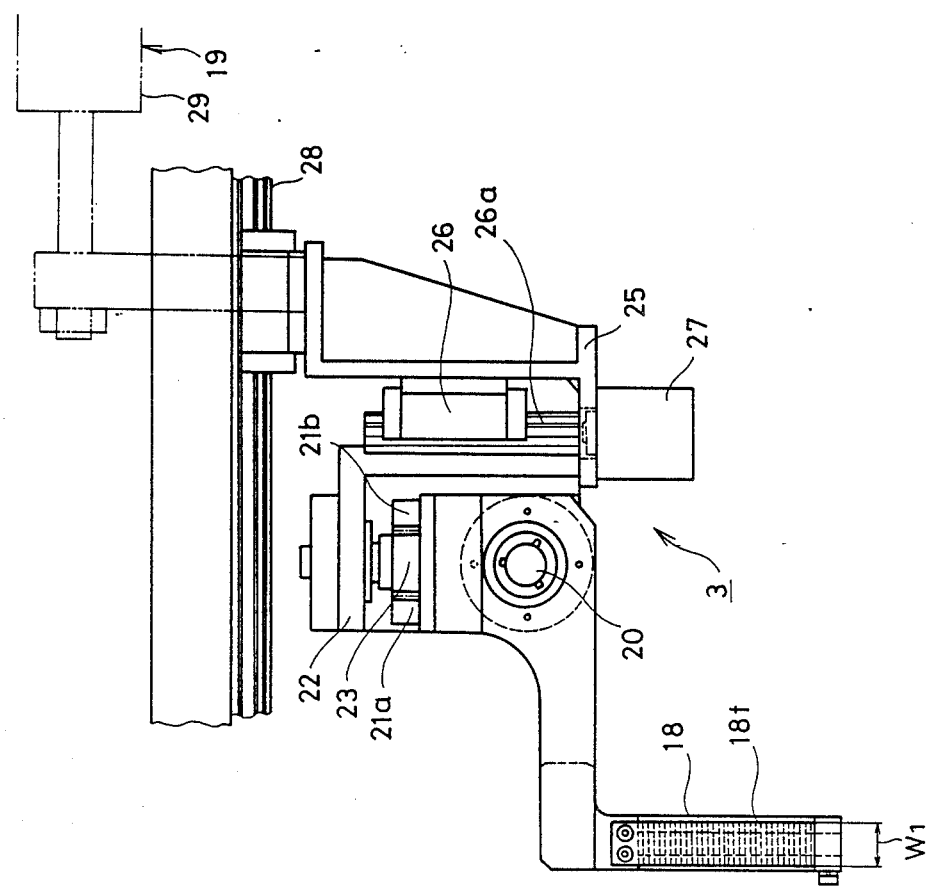
FIG. 3A is an enlarged front view representing part of a first holding device of the embodiment of FIG. 1.
Figure 3B:
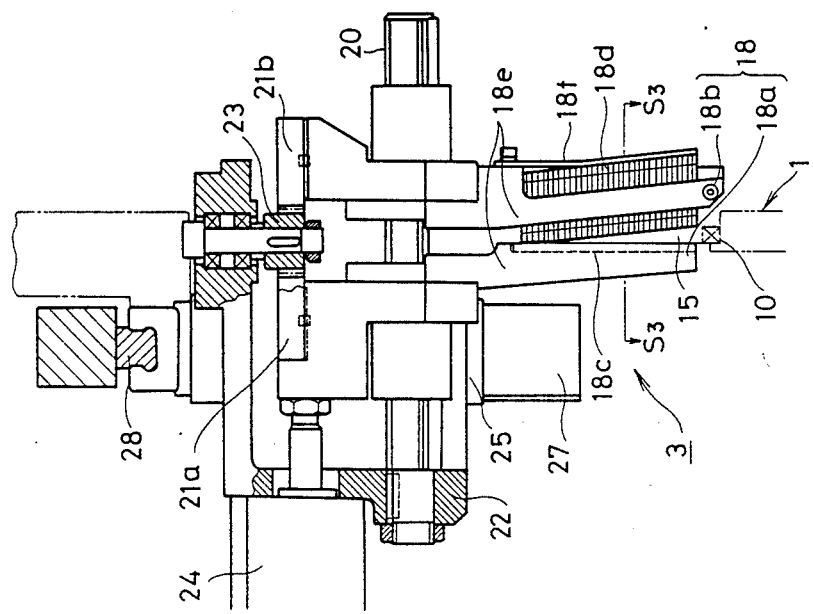
FIG. 3B is a partially sectional side view representing the part of FIG. 3A.
Figure 2C:
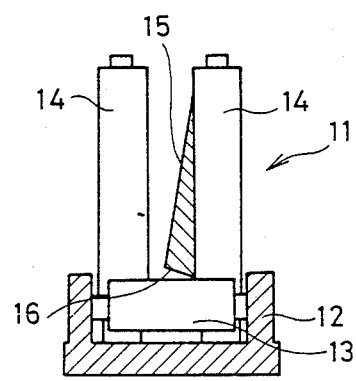
FIG. 2C is a sectional view along the line S2—S2 of FIG. 2A.

The bead apex guide device 2 is composed of a bead apex guide 11 fixed horizontally to the machine frame and provided with a fixed guide body 12 having a U-shaped cross-section and lateral conveyer rollers 13 and vertical guide rollers 14 rotatably supported along the guide body 12 as shown in FIGS. 2A, 2B and 2C. A bead apex 15 can be guided toward the former 1 in an erect attitude with its bottom surface 16 downward so that the bottom surface 16 is supported by the lateral conveyer rollers 13 and either side surface of the bead apex is in contact with the vertical guide rollers 14 in either side. The height of a bead apex support plane provided by the lateral conveyer rollers 13 is substantially coincides with the top level of the outer circumference of the bead ring 10 mounted on the periphery of the former 1. The front end portion of the bead apex guide 11 is composed of a guide-grooved member 17 and the top of the outer periphery of the bead ring 10 is positioned on its extension. In the drawings, 11a denotes a roller similar to the vertical guide rollers and 11b denotes a member for preventing reverse movement of the bead apex 15. The bead apex guide 11 further includes heater elements (not shown) attached to the whole inner surface of both side walls of the guide body 12, so that the bead apex 15 passing therethrough is heated up to about 100° C. The belt-like bead apex 15 is preferably fed to the bead apex guide directly from an adjoining extruder through a festoon or, for preventing deformation of the leading end, through a cooling drum (e.g., about 60° C.). Alternatively, the bead apex previously wound into a roll may be fed from a letoff stand. In this case, the heat quantity for heating the bead apex prior to the bead apex applying process should be increased.

As shown in FIG. 1, the first holding device 3 consists of a catching unit 18 for pinching or clipping the bead apex 15 from its both sides and a driving unit 19 for moving the catching unit 18 toward and away from the outer periphery of the bead ring 10 mounted on the former 1. The catching unit 18 includes contact members 18a and 18b as shown in magnification in FIGS. 3A to 3D. Each contact member has a width W1 of about 20 millimeters, for example. The contact surface of the contact member 18a is formed of a permanent magnet 18c and the contact surface of the other contact member 18b is formed of laminated steel plates 18d so as to contact the both side surfaces of either the leading end or the tail end of the bead apex across substantially the whole width thereof to pinch and restrain the bead apex with a uniform pressure. Accordingly, when the contact members mutually approach to pinch the bead apex 15, the edges of respective laminated steel plates 18d are attached by the permanent magnet 18c and automatically conform themselves to a side face of the bead apex to tightly catch it. The laminated steel plates 18d are formed by piling a number of H-shaped steel plates and held by a pair of arms 18e to allow some movement of each plate along the plane of lamination. In the drawings, 18f denotes a leaf spring which urges the laminated plates 18d to the permanent magnet 18c. While an air-bag may be used for the same purpose, the above-mentioned combination of the laminated steep plates 18d and the permanent magnet 18c have more advantages such that even the peripheral edge region of the bead apex can be caught more easily and certainly, that no air source and piping is required, and that the contact members need not be changed in size with variation of the height (or width) of the bead apex and a single pair of contact members are sufficient for catching various bead apices. The contact members 18a and 18b are supported on a guide rod 20 movably along it. The guide rod 20 is fixed to a vertical movable bracket 22, and a pinion 23 pivoted on this bracket 22. The pinion 23 meshes with a pair of racks 21a and 21b respectively fixed to the contact members 18a and 18b and one rack 21a is driven by an air-cylinder 24. With actuation of the air-cylinder 24, both contact members 18a and 18b move along the guide rod 20 to mutually approaching or departing direction to open or close the catching unit 18. The guide rod 20 and the base portions of contact members 18a and 18b are fit together in a ball-spline structure. The bracket 22 having a vertical rail 26a fixed thereto is adapted to slide vertically along a guide portion 26 fixed to another bracket 25. An air-cylinder 27 is coupled to the bracket 22, so that the bracket 22 is driven upward by the air-cylinder 27 and downward by its own weight. The bracket 25 is supported by a guide rail 28 and adapted to move horizontally forward and backward along the guide rail 28. The movable bracket 25 is coupled to large and small air-cylinders 29 and 30 which are coupled in series to form the drive unit 19 as shown in FIG. 1 and adapted to move the catching unit 18 toward the former 1 to a first position A near the front end of the bead apex guide 11, second and third positions B and D above the former 1 and a fourth position C between the first and second positions and stop it thereat by combining various strokes of these air-cylinders. The catching unit 18 serves a function of catching the leading end of the bead apex at a position which is, for example, about 10 millimeters apart from the leading end in the direction of the guide, and drawing out it to a position above the bead ring and pressing it against the outer peripheral surface of the bead ring, before applying the bead apex thereto, and also serves a function of catching the tail end of the bead apex having a predetermined length at a position which is, for example, 10 millimeters apart from the tail end in the direction of the bead ring, when the bead apex is cut in a predetermined length and letting itself be drawn toward the bead ring with rotation of the bead ring as catching the tail end of the bead apex and then clamped to restrain its further movement, after the apex is cut. The air-cylinder 30 and the guide rail 28 are supported by the machine frame at one ends thereof.

The second holding device 4 is of a pincers type and attached to the former 1. As shown in FIGS. 4A and 4B, mutually parallel shafts 31a and 31b are rotatably supported by the former 1, contact members 33a and 33b of a pinching unit 33 and mutually meshing pinions 34a and 34b are fixed to the respective shafts 33a and 33b and a rack 35 meshing with the pinion 34b is driven forward and backward by an air-cylinder 36 fixed to the former 1 to open and close the pinching unit 33 in arrow direction as shown in phantom. In the closed state, the pinching unit 33 catches the leading end of the bead apex 15, which is pressed against the peripheral surface of the bead ring 10 mounted on the former 1, from both sides thereof to fixedly restrain it as shown in the drawings. The contact members 33a and 33b of the pinching unit 33 have their contact surfaces respectively formed of a permanent magnet and laminated steel plates as same as the contact members 18a and 18b of the first holding device 3 and come in contact with the leading end of the bead apex 15 across substantially the whole width thereof to firmly restrain it. The pinching width of the pinching unit 33 is preferably less than about 20 millimeters, since it is liable to result in a gap between the bottom surface of the bead apex 15 and the outer periphery of the annular bead 10 to cause insufficient bond if it exceeds 20 millimeters. The pinching unit 33 serves a function of receiving the leading end of the bead apex, which is drawn out from the bead apex guide 11 and pressed against the outer peripheral surface of the bead ring 10 by the pinching unit 18 of the first holding device 3, to catch it and maintain its catching state throughout a period from the start to the end of the bead apex applying process with rotation of the bead ring 10.

Figure 5A:
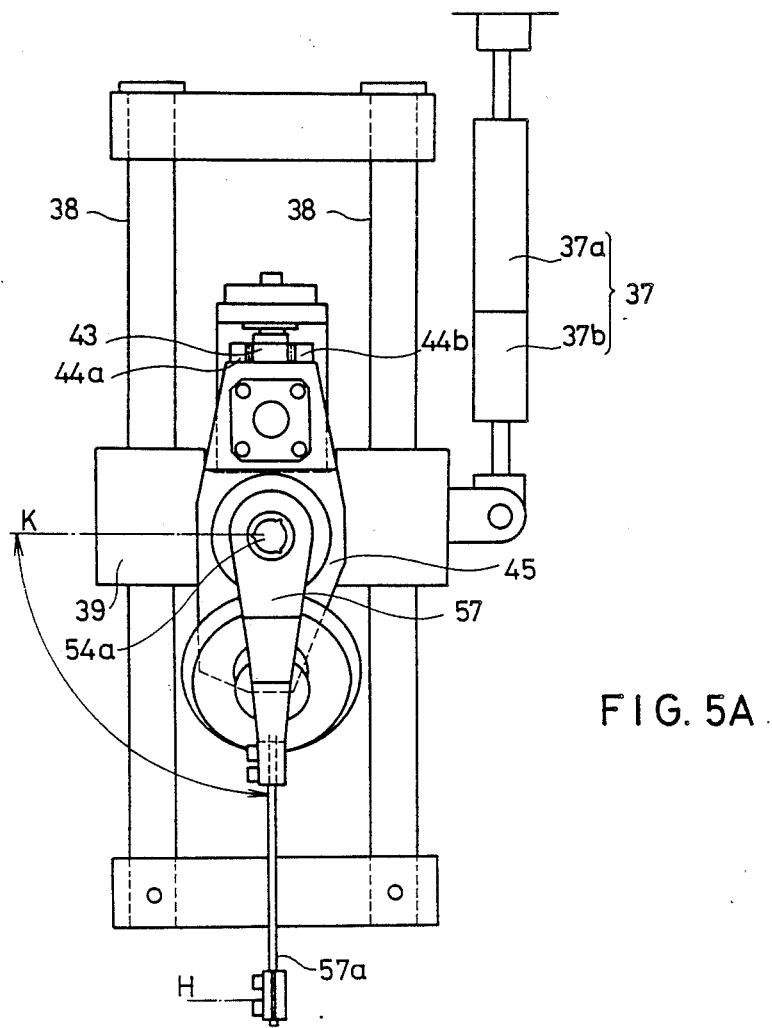
FIG. 5A is an enlarged front view representing a bead apex pressing device with a joint pressing device of the embodiment of FIG. 1.
Figure 5C:
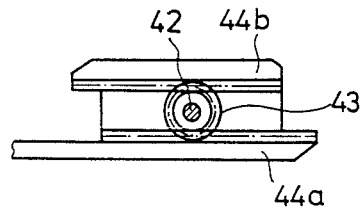
FIG. 5C is a plan view representing part of the bead apex pressing device of FIG. 5A.
Figure 5D:
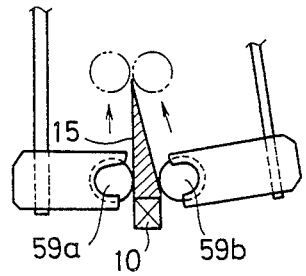
FIG. 5D is a partially sectional side view representing part of the joint pressing device of FIG. 5A.
Figure 5B:
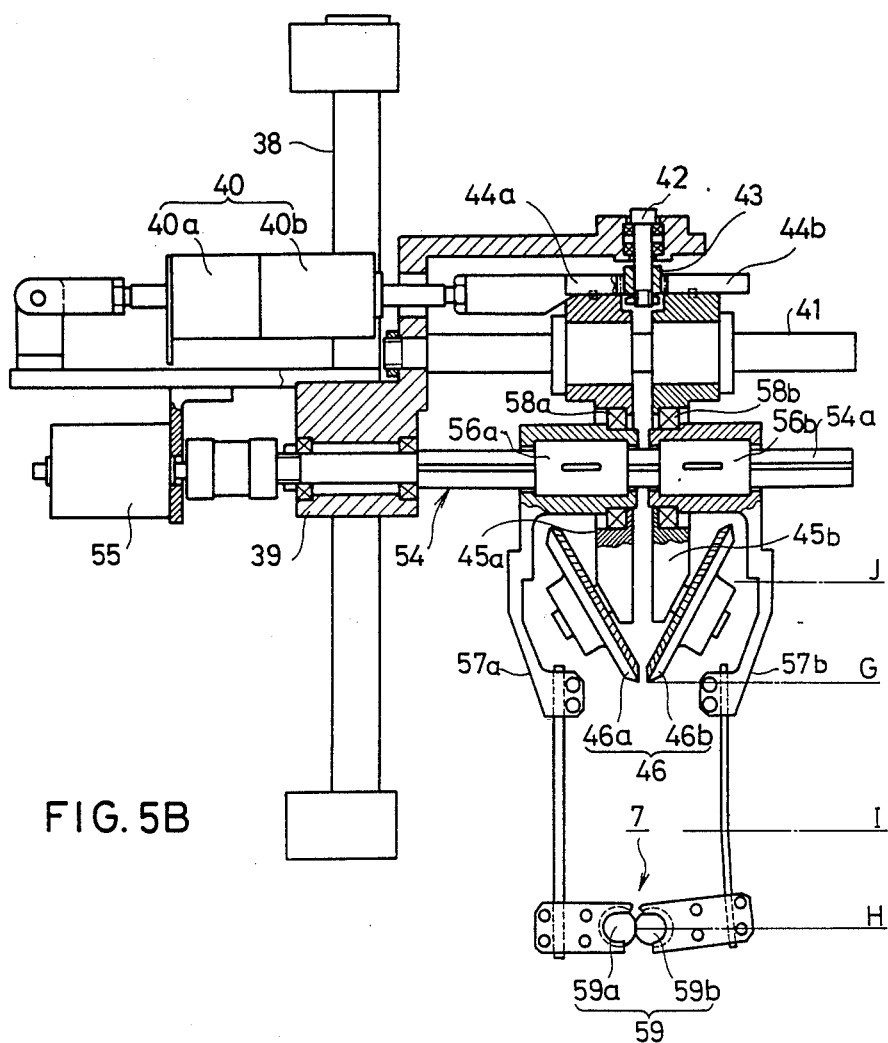
FIG. 5B is a sectional side view representing the devices of FIG. 5A.

As shown in FIGS. 5A to 5C, the bead apex pressing device 5 of FIG. 1 has such a structure in that a two-stage air-cylinder 40 and a lateral guide rod 41 are supported by a movable frame 39 which is guided by a vertical guide rods 38 to be movable vertically upward and downward with an action of a two-stage air-cylinder 37 supported by the machine frame and a bead pressing unit 46 composed of a pair of pressing rollers 46a and 46b is supported on the guide rod 41. The two-stage air-cylinder 37 consists of two-air cylinders 37a and 37b which are controlled independently. The two-stage air-cylinder 40 consists of air-cylinders 40a and 40b which are also controlled independently to provide a horizontal reciprocating motion which is normal to the bead apex feeding direction above the former 1. A pinion 43 is pivotably supported by a vertical shaft 42 on the vertically movable frame 39 so as to be positioned just above the former 1. Racks 44a and 44b are adapted to move in parallel with each other so as to mesh with the pinion 43 and the rack 44a is coupled to the above-mentioned two-stage air-cylinder 40. The lateral guide rod 41 extends from the movable frame 39 in a horizontal direction normal to the bead apex feeding direction and a pair of pressing roller supports 45a and 45b are supported thereon through linear ball bearings so as to move along it. The racks 44a and 44b are respectively fixed to the upper ends of the roller supports 45a and 45b and a pair of pressing rollers 46a and 46b are supported rotatably at the bottom ends thereof so as to face obliquely each other. The roller supports 45a and 45b are drawn near and apart from each other through the pinion 43 and the other rack 44b when the rack 44a is driven forward and backward by the air-cylinder 40. The pressing rollers 46a and 46b are adapted to move downward by an action of the air-cylinder 37 from a stand-by position G to a lowermost position H at which they come in contact with the lower portions of both side surfaces of the bead apex 15 bonded to the outer periphery of the bead ring 10 on the former 1, as shown in FIG. 5A. The pressing rollers 46a and 46b can be moved also by the air-cylinder 37 to an uppermost position J. Each of the pressing rollers 46a and 46b has a surface to be in contact with the bead apex 15 having small grooves radially formed therein throughout the circumference. The pressing rollers 46a and 46b pinch the lower portion of the bead apex 15 from both sides thereof and rotate with the bead ring 10 and the bead apex 15 rotating with the former 1, thereby pressing the bead apex 15 against the bead ring 10. At this time, the two-stage air-cylinder 40 extends both cylinders 40a and 40b thereof and the gap between the pressing rollers 46a and 46b is 3 millimeters. The gap of the pressing rollers 46a and 46b can be adjusted to another desired gap such as 33 or 93 millimeters by an action of the two-stage air-cylinder 40.

Figure 6E:
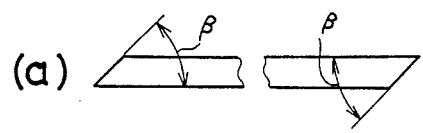
FIG. 6E is a set of plan, side and end views representing an exemplary cut angle of the bead apex used in the embodiment of FIG. 1.
Figure 6E:
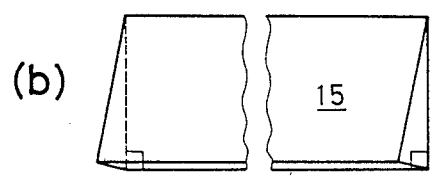
Figure 6E:
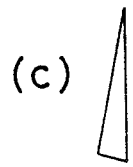
Figure 6A:
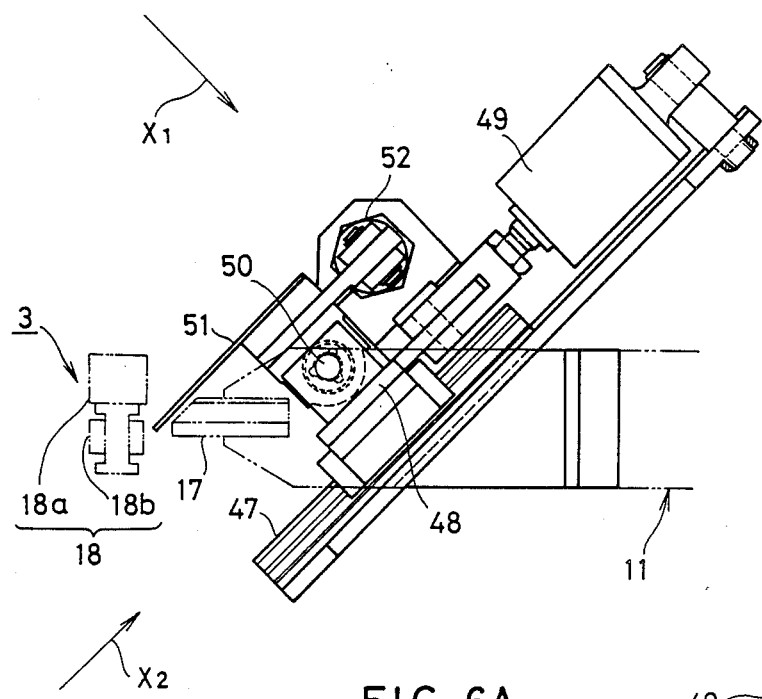
FIG. 6A is an enlarged plan view representing part of an bead apex cutting device of the embodiment of FIG. 1.
Figure 6D:
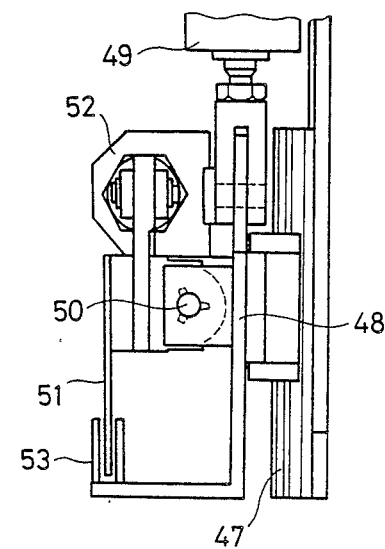
FIG. 6D is a plan view representing the part of FIG. 6C as viewed from the arrow direction X3.
Figures 6B, 6C:
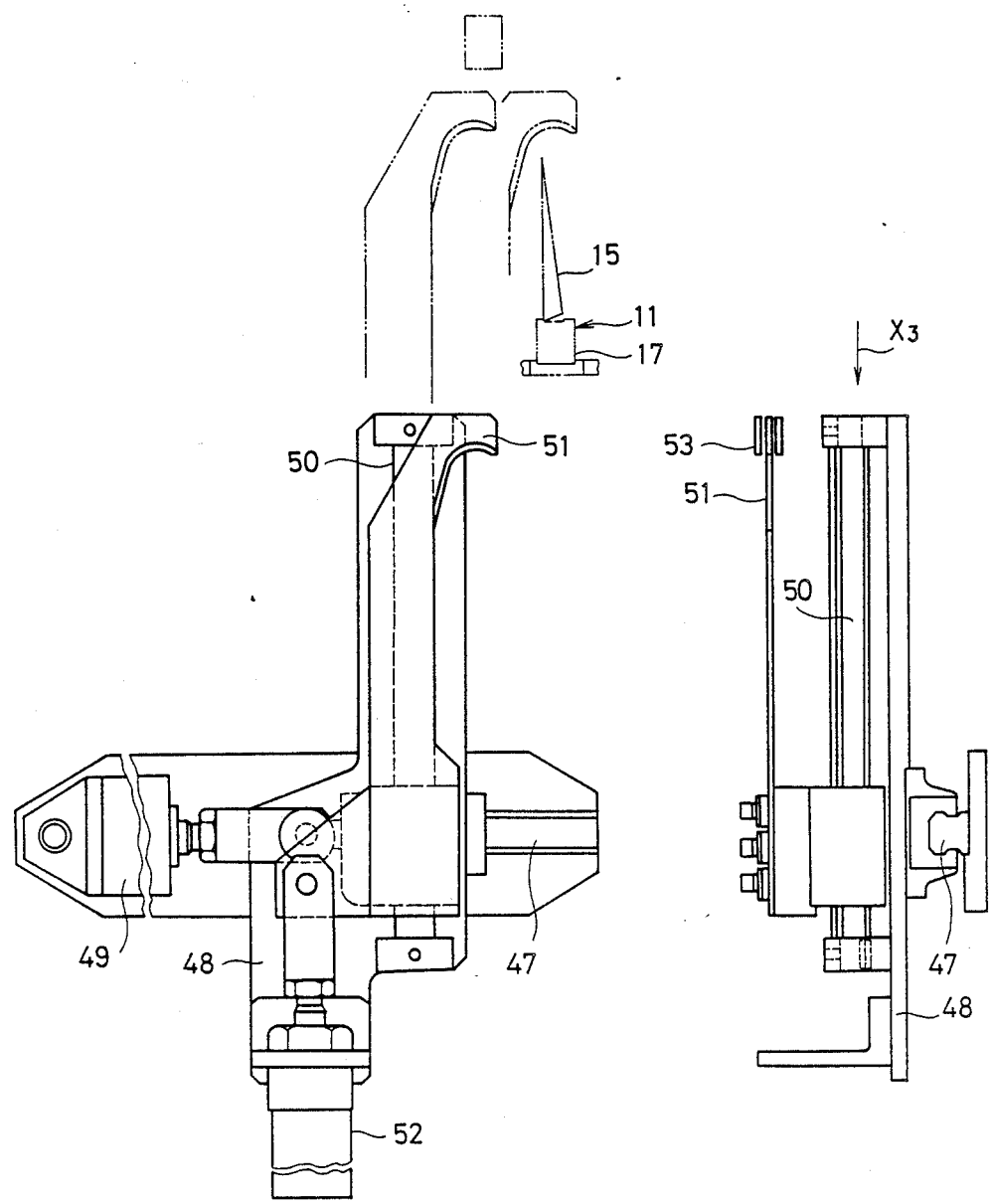
FIG. 6B is a side view representing the part of FIG. 6A as viewed from the arrow direction X1.
FIG. 6C is another side view representing the part of FIG. 6A as viewed from the arrow direction X2.

As shown in phantom in FIG. 1, the cutting device 6 is located between the bead apex guide 11 and the former 1 to define a bead apex cutting position at a short distance in the direction of the apex guide 11 from a fourth position C at which the first holding device 3 stops in the way of its movement. As shown in FIGS. 6A to 6D, a guide rail 47 is fixed to the machine frame so as to obliquely traverse under the bead apex 15 drawn out from the bead apex guide 11 and a movable bracket 48 is adapted to be driven forward and backward by an air-cylinder 49 between a drawn-back position and the cutting position along the rail 47. The movable bracket 48 is provided with a vertical guide rail 50 and a cutter 51 is adapted to be driven upward and downward along the rail 50 by an air-cylinder 52 to cut the bead apex 15 in the widthwise direction from the edge to the bottom thereof during its vertical movement. At this time, the leading end of the bead apex applied to the bead ring has rotated by a predetermined angle so that the cut length of the bead apex extending from the leading end to the cutter operating position corresponds to the circumrerential length of the bead ring. In FIGS. 6C and 6D, 53 denotes a heater fixed to the movable bracket 48 for heating the cutter 51 when it is lowered by the air-cylinder 52 and comes in a stop. In the position as shown by solid lines in the drawings, the moveable bracket 48 is at its drawn-back stand-by position and the cutter is heated while it is at its lowered position. When the air-cylinder 52 is driven to extend and then the air-cylinder 49 is driven to extend so that the cutter 51 moves upward and then forward to come in a position above the apex 15. The air-cylinder 52 is, then, driven to contract, the cutter 51 is lowered to cut the apex 15 as described above. As shown in FIG. 6E, the cut surface of the bead apex 15 is normal to the lengthwise direction of the apex in the front view (FIG. 6E(b)) and has an acute angle $\beta$, which is 45 degrees for example, with respect to the lengthwise direction of the apex in the plan view (FIG. 6E(a)). The cutter 51 returns to the drawn-back position together with the movable bracket 48 with contraction of the air-cylinder 49 after the cutting operation.

The joint pressing device 7 is supported by the vertically movable frame 39 of the bead apex pressing device 5. As shown in FIGS. 5A to 5D, a spline shaft 54 is arranged under and parallel to the lateral guide rod 41 and has one end left free and the other end supported through a ball bearing by the vertically movable frame 39 and also coupled to a rotary actuator 55. A pair of slide members 56a and 56b are fit on a spline portion 54a of the spline shaft 54 and also respectively fit in and keyed with the upper portions of pressing unit holding arms 57a and 57b which are fit on the slide members 56a and 56b are further coupled rotatably through ball bearings 58a and 58b to the above-mentioned pressing roller supports 45a and 45b so as to pass therethrough these supports together with the spline shaft 54. Accordingly, the pressing unit holding arms 57a and 57b move with movement of the pressing roller supports 45a and 45b respectively, along the lateral guide rod 41 and can be swung by 90 degrees by a rotary actuator 55 between a vertically hanging position (operational state) as shown by the solid lines and a horizontal position (stand-by srate K) as shown in phantom. A pair of disc-like pressing rollers 59a and 59b comprising a joint pressing unit 59 are rotatably held in semi-circular grooves at the lower ends of the holding arms 57a and 57b , respectively. The lower half of one holding arm 57b is formed of an elastic material such as leaf spring. The joint pressing unit 59 can be moved by the two-stage air-cylinder 37 from a lowermost position H corresponding to the lowermost portion of the bead apex to the edge position I corresponding to the edge of the bead apex and, as described above, it can be swung by an action of the rotary actuator 55 between the above-mentioned lowermost position H and the horizontal stand-by position K. Moreover, the gap between the pair of pressing rollers 59a and 59b can be adjusted as described by an action of the two-stage air-cylinder 40. For example, the two-stage air-cylinder 40 is operated to fully open the gap so as to avoid interference with the arms of the pinching unit 18 of the first holding device 3 and the joint pressing unit 59 is then swung down. The pressing rollers 59a and 59b may be made of MC nylon, for example, in order to obtain smooth rotation.

Figure 7B:
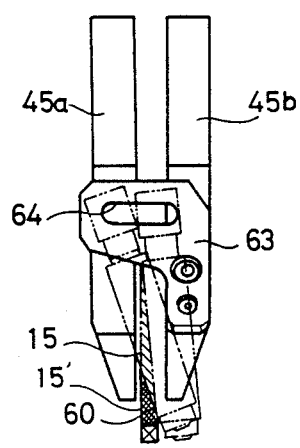
FIG. 7B is a side view representing the structure of FIG. 7A.
Figure 7A:
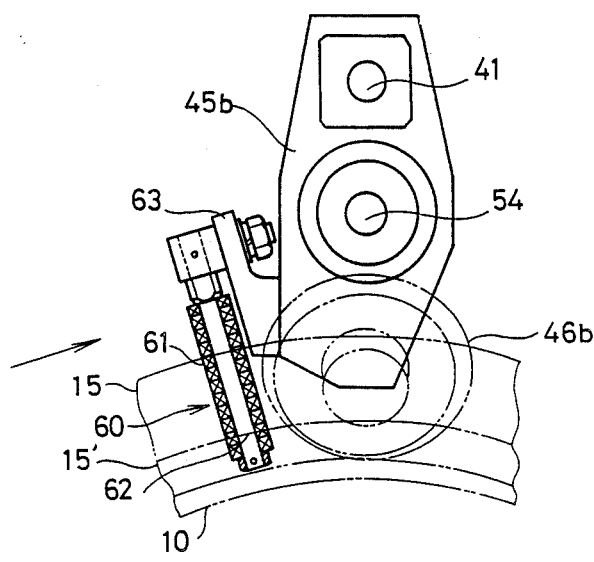
FIG. 7A is an enlarged front view representing bead apex suspension rollers and their mount structure of the embodiment of FIG. 1.

As shown in FIGS. 7A and 7B, an additional roller 60 is attached to the aforementioned pressing roller support 45b through a bracket 63. The roller 60 is composed of a number of ball bearings 61 fit on a shaft 62 to have their outer rings freely rotatable. The bead apex 15 has a tendency of falling down to one side thereof due to its non-symmetric cross-section as shown in FIG. 6E just after it is pressed against the peripheral surface of the bead ring 10 on the former by the pressing rollers 46a and 46b. In order to prevent this fall of the bead apex 15, the toller 60 is disposed just after the pressing roller 46b so that its peripheral surface is in contact with the falling side of the bead apex 15 at a predetermined slanting angle. The support end of the roller shaft 62 is clamped to the bracket 63 through a slot hole 64 thereby the slanting angle of the roller 60 can be adjusted so that the roller 60 can contact the falling side of any bead apices which vary in height as shown in phantom 15 and 15' in FIG. 7B. Although the fall preventing roller 60 is attached to the roller support 45b in the illustrated embodiment, it is a matter of course that it should be attached to the roller support 45a if the bead apex 15 has a tendency of falling to the opposite side.

The bead apex applying device constructed as above operates by sequence control as follows.

(1) The cut leading end of the bead apex 15 is positioned at a predetermined position which is 30 to 40 millimeters forward toward the former 1 from the front end of the bead apex guide 11 of the bead apex guide device 2. The leading end of the bead apex 15 is then pinched from both sides thereof across the whole width at the first position A near the guide 11 by the catching unit 18 of the first holding device 3 as a result of extension of the air-cylinder 24. The leading end of the bead apex 15 projects about 30 to 40 millimeters from the catching unit 18 at this time as shown in FIG. 1.

(2) The first holding device 3 is raised by a small distance (about 10 millimeters) by an action of the air-cylinder 27 to its stroke end.

Figure 8:
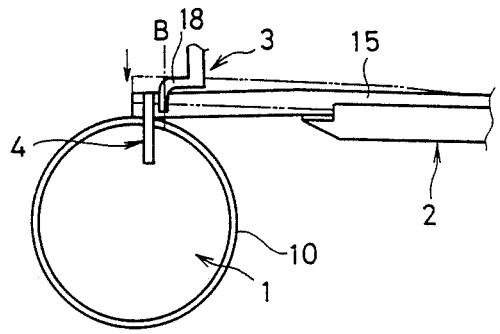

(3) The first holding device 3 moves toward the former 1 to the second position B as a result of extension of the large air-cylinder 29 as catching the bead apex 15 (see, FIG. 8).

(4) The first holding device 3 is lowered as a result of contraction of the air-cylinder 27 to its stroke end to press the leading end of the bead apex 15 which it catches against the peripheral surface of the bead ring 10 mounted on the former 1. The peripheral surface of the bead ring 10 and the bottom surface of the bead apex 15 adhere together with a mutual adhesive force.

(5) The pinching unit 33 of the second holding device 4 which is in the open state is closed by the air-cylinder 36 to pinch the leading end of the bead apex 15 from both sides thereof across its whole width as shown in FIGS. 4A, 4B and 8. At this pinching position, the leading end of the bead apex 15 extends forward about 10 millimeters therefrom.

(6) After the pinching operation of the second holding device 4, the first holding device 3 releases the bead apex 15 by an action of the air-cylinder 24 and then returns to the intermediate fourth position C as a result of contraction of the large air-cylinder 29 and extension of the small air-cylinder 30. This position C does not interfere the apex cutting operation and is suitable for catching the cut tail end thereof (see, FIGS. 1 and 9).

(7) After the releasing operation of the first holding device 3, the former 1 starts to rotate and, thereby, the bead apex 15 with its leading end caught and restrained by the second holding device 4 is succeedingly wound around the peripheral surface of the bead ring 10 and bonded thereto in annular fashion.

(8) When the second holding device 4 passes under the pressing rollers 46a and 46b which are in their raised position just after the start of rotation of the former 1, both air-cylinders of the two-stage air-cylinder 37 of the bead apex pressing device 5 operates to extend to lower the pressing rollers 46a and 46b together with the bead apex fall preventing roller 60 to the lowermost position H (the gap between the pressing rollers 46a and 46b is 33 millimeters at this time as a result of extension of the air-cylinder 40b), and then moves mutually inward as a result of extension of the two-stage air-cylinder 40a to pinch the lower portion of the bead apex 15 from its both sides and, at the same time, the bead apex fall preventing roller 60 comes in contact with one side surface of the bead apex to guide it and, therefore, the bottom surface of the bead apex is press-bonded to the outer peripheral surface of the bead ring with rotation of the former 1. The pressing rollers 59a and 59b are at their raised stand-by position at that time. The passage of the second holding device may be detected by a proximity switch.

Figure 9:
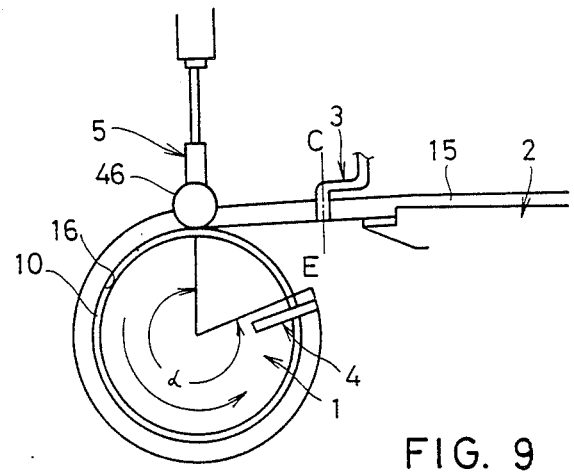

(9) The rotation of former 1 stops in the way of bead apex applying process at a position E when the leading end of the bead apex applied to the bead ring rotates by a predetermined angle of rotation $\alpha$ at which the length of the bead apex from the leading end to the cutter operating position becomes equal to the peripheral length of the bead ring (see, FIG. 9).

(10) The catching unit 18 of the first holding device 3 standing by at the intermediate fourth position C is closed by the air-cylinder 24 to catch the tail end of the bead apex 15 at a position a little away (about 10 millimeters) from the predetermined cutting position in the direction of the former 1.

(11) Succeedingly, the cutter 51 of the cutting device 6 which is in the stand-by position is raised by the air-cylinder 52 and moved forward to the cutting position by the air-cylinder 49 and, then, it is lowered by contraction of the air-cylinder 52 across the width of the bead apex to cut it in a predetermined length. As described above with reference to FIG. 6E, the cut surface of the bead apex is slanting to lengthwise direction of the bead apex in the plan view and normal to the lengthwise direction of the bead apex in a front view. After the cutting operation, the cutting device 6 returns to its stand-by position by an action of the air-cylinder 49. Then, the air-cylinder 40a operates to contact to put the pressing rollers 46a and 46b in a half-open state (33 millimeters) and the air-cylinder 40a operates to extend to raise the pressing rollers 46a and 46b to the intermediate stand-by position G. Then, the pressing rollers 46a and 46b are put in a full-open state (93 millimeters) by extension of the air-cylinder 40b to prevent contact with the first holding device 3 when they are succeedingly turned down.

Figure 10:
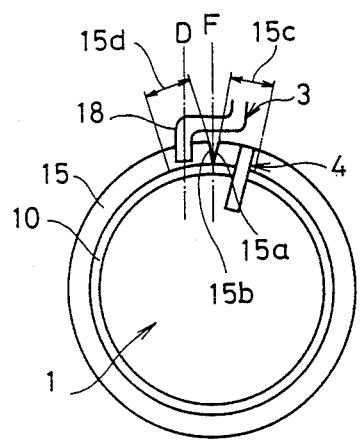
FIGS. 8 to 11 are partial front views representing various states of the embodiment of FIG. 1 illustrating the process of applying the bead apex to the bead ring by the device of this embodiment.
Figure 11:
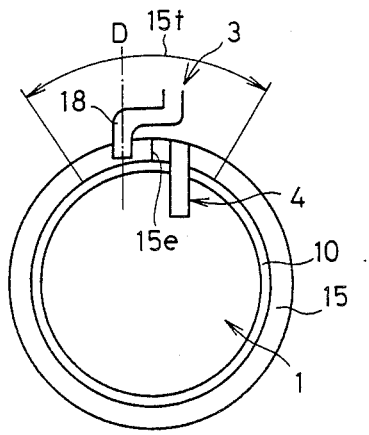

(12) After the cutting operation of the cutting device 6, the former 1 resumes its rotation to the same direction. As the air conduit of the large air-cylinder 29 in contraction is opened to the atmosphere prior to the resumption of rotation, the rotation of the former 1 causes the remaining portion of the bead apex 15 to be applied to the outer peripheral surface of the bead ring and the first holding device catching the tail end of the bead apex to be drawn toward the bead ring. This drawing operation is effected by forcively exhausting the back pressure of the large air-cylinder 29. When the former 1 rotates further to put the lower portions of the leading and tail end cut surfaces 15a and 15b of the bead apex in mutual contact on a center line F of the former 1, the first holding device which have been drawn thereto as catching the tail end 15d is stopped at the stroke ends of the large and small air-cylinders 29 and 30 and its catching unit 18 is clamped at the third position D as shown in FIG. 10. Leaving the tail end 15d of the apex to be clamped by the first holding device 3, the former 1 continuously rotates by a small extent to draw the cut surface 15a of the leading end 15c of the bead apex to the cut surface 15b of the tail end 15d thereof (both end surface are mutually facing through a small V-shaped gap therebetween) and joined together to form a joint. The rotation of the former stops upon completion of this joining operation.

(13) Following the stop of rotation of the former 1, the joint pressing device 7 operates to press the joint of both ends of the bead apex 15. In this joint pressing operation, the joint pressing unit 59 including the pair of pressing rollers 59a and 59b, which are already in the full-open state, is turned down by 90 degrees by by the rotary actuator 55 from its horizontally raised stand-by position K to the position H which is in the same level as the lower portion of the apex and, then, both air-cylinders 40a and 40b of the two-stage air-cylinder 40 extend to minimize the gap between the pressing roller support arms 57a and 57b to press the pressing rollers 59a and 59b against both surfaces of the joint 15e of the bead apex 15. Succeedingly, the air-cylinder 37b contracts to raise the pressing rollers 59a and 59b which are pressed against both side faces of the joint to the position I to squeeze the joint. Thus, the joint pressing operation is completed and the air-cylinders 40a and 40b of the two-stage air-cylinder 40 contract to put the pressing rollers 59a and 59b in the full-open state. Then, the rotary actuator 55 rotates inversely to turn up the joint pressing unit 59 by 90 degrees to return it to its stand-by state.

(14) The catching units 18 and 33 of the first and second holding devices return to their original stand-by positions as keeping the open state.

(15) The former 1 is then rotated inversely to position the leading end of the portion 15f (see, FIG. 11) of the bead apex which are not yet press-fit by the pressing rollers 46 under the pressing device 5 (the gap between the pressing rollers 46a and 46b is in the half-open state) and the rotation is stopped. Then, the pressing rollers 46a and 46b are lowered to the position H by extension of the air-cylinders 37a and 37b and the bead apex is caught from its both sides by extension of the air-cylinder 40a and then the former 1 is rotated forwardly to press-fit the unpressed portion 15f of the apex 15 to the peripheral surface of the bead ring 10.

(16) Upon completion of the press-fitting operation, the former 1 stops and the air-cylinder 40a contracts to put the pressing rollers in the half-open state. Then, the air-cylinder 37a contracts to raise the bead apex pressing device 5 and the pressing unit 46 returns to its stand-by position G. Thereafter, the former 1 contracts in diameter for removing the bead ring with bead apex.

While the above-mentioned embodiment is shown to have a structure in that the bead apex guide 11 is disposed horizontally and the outer periphery (top portion) of the bead ring is in contact with the extension of the apex guide 11, the apex guide 11 may be slanting and the outer periphery of the bead ring may deviate from the extension of the apex guide 11 in another embodiment.

While the above-mentioned embodiment is shown to have the bead apex guide rollers 60 supported by the pressing roller supports 45, it may be constructed to have an independent supports and independent driving unit for the apex guide rollers. However, this is less advantageous than the illustrated embodiment since it is more complicated in structure in view of additional needs of moving mechanism and driving unit. Though not described in detail in the above embodiment, the bead apex has a general cross-sectional shape as shown in FIG. 2C and a general apex applying mode as shown in FIG. 5D in which one side face thereof is vertical with respect to the bead, and the illustrated embodiment shows an example thereof. Especially, such bead apex has a tendency of falling to the side of another slanting side surface opposite to the vertical one and the bead apex guide roller 60 prevents such falling to one side.

Though not described in the above embodiment, it may be desirable to arrange the whole structure such that the former 1 and the other group of devices such as first holding device 3, bead apex pressing device 5 and cutting device 6 can be relatively moved in the vertical direction using a hydraulic cylinder or screw rod so that it can conform more easily to possible variation of the bead diameter. In this case, the former 1 may be constructed so that its diameter is expandable and contractable in conformity with any bead diameter or may be interchanged with another which conforms the bead diameter.

In the above embodiment, the purpose of cutting the apex at an acute angle $\beta$ with respect to the lengthwise direction of the bead apex in the plan view as shown in FIG. 6E(a) is to obtain a circumferential overlapping state at the joint to absorb possible cutting errors and avoid any defective joint. The cut surface may be normal to the lengthwise direction of the bead apex (i.e., $\beta = 90$ degrees) in the plan view as occasion demands. Alternatively, the apex may be cut so that the cut surfaces at the leading and tail ends are oppositely slanting with respect to the lengthwise direction of the apex in the front view of FIG. 6E(b). In this case, the bead apex is cut by moving the cutter 51 across its width at a positive slanting angle for one end and at a negative slanting angle for the other end and a cut piece is removed. The cut faces may be either normal or slanting to the lengthwise direction in the plan view.

As described above, this invention is adapted so that the leading end of the bead apex maintains a caught and restrained state by the holding device at least throughout the period extending from the start to the end of the bead apex applying operation or the period from the drawout of the bead apex to the end of the bead apex applying process, and the tail end of the apex also maintains a similar caught and restrained state by the holding device throughout the period from the cutting of apex in a predetermined length to the end of the bead apex applying process. Therefore, a highly good joint of both ends without any affection by rubber shrink and likes is obtainable. Moreover, no deformation occurs in the vicinity of the joint and the uniformity of the tire bead portion is improved, thereby significantly contributing to improvement of the tire quantity. Moreover, there is no problem of open joint since the joint is squeezed and pressed after bonding.

According to this invention, the bonding device is simplified as a whole and economical since it is adapted so that the first holding device serves two functions including a function of catching the leading end of the bead apex and drawing out it toward the former and a function of catching and applying the tail end of the bead apex during the second half of the bead apex applying process and that the bead apex fall preventing roller is supported by the press-fitting device.

We claim:

1. A method of applying a bead apex to a bead ring comprising the steps of:
   (A) drawing out the leading end of a bead apex having a substantially triangular cross-section to a position above a rotatably supported bead ring;
   (B) pressing said leading end of said bead apex against the peripheral surface of the bead ring;

(C) initiating a bead apex applying process by rotating said bead ring to successively apply the bead apex in annular fashion to the peripheral surface of the bead ring;

(D) stopping the rotation and cutting the bead apex to a predetermined length when the leading end rotates to a predetermined angle;

(E) rotating further the bead ring to apply the bead apex to the whole peripheral surface of the bead ring; and (F) bonding cut surfaces of the leading end and the tail end of the bead apex together to complete said bead apex applying process;

wherein the tail end of said bead apex is caught and restrained by a first holding device during step (D) through step (F); and wherein the leading end of said bead apex is caught and restrained by a second holding device at least during step (C) through step (F).

2. A method of applying a bead apex to a bead ring, as set forth in claim 1, wherein the leading end of said bead apex is caught and restrained by said second holding device during step (A) and step (B) and also during step (C) through step (F).

3. A method of applying a bead apex to a bead ring, as set forth in claim 2, wherein the joint of both ends of said apex is pressed by a joint pressing device.

4. A method of applying a bead apex to a bead ring, as set forth in claim 3, wherein both ends of said bead apex are pinched and restrained across substantially the whole width of said bead apex.

5. A method of applying a bead apex to a bead ring as set forth in claim 1, wherein the joint of both ends of said apex is pressed by a joint pressing device.

6. A method of applying a bead apex to a bead ring as set forth in claim 1, wherein both ends of said apex are pinched and restrained across substantially the whole width of said bead apex.

7. A method of applying a bead apex to a bead ring as set forth in claim 2, wherein both ends of said apex are pinched and restrained across substantially the whole width of said bead apex.

8. A method of applying a bead apex to a bead ring comprising the steps of:

(A) catching the leading end of a bead apex having a substantially triangular cross-section with a first holding device;

(B) drawing out said leading end of said bead apex to a position above a rotatably supported bead ring;

(C) pressing said leading end of said bead apex against the peripheral surface of the bead ring;

(D) catching the pressed leading end of the bead apex with a second holding device and then releasing the first holding device;

(E) rotating the bead ring so as to successively apply the bead apex in annular fashion to the peripheral surface of the bead ring while the leading end of the bead apex is held by the second holding device;

(F) stopping rotation at an angle of rotation at which the length of the bead apex from the leading end to a cutter operating position is equal to a predetermined length;

(G) catching the tail end of the bead apex of said predetermined length with the first holding device and cutting the bead apex to the predetermined length;

(H) rotating again the bead ring to apply the bead apex to the whole peripheral surface of the bead ring by the rotational force of the bead ring;

(I) drawing the first holding device which holds the tail end of the bead apex toward the bead ring;

(J) clamping the first holding device which holds the tail end of the bead apex when the lower portions of cut surfaces of the lead end and the tail end of the bead apex butt against each other;

(K) further drawing the leading end by a slight continued rotation of the bead ring as the tail end of the bead apex is in a fixed state as a result of clamping of the first holding device;

(L) joining whole cut surfaces the leading end and the tail end of the bead apex to form a joint; and (M) pressing the joint with a joint pressing device.

9. A device for applying a bead apex in annular fashion to the peripheral surface of a bead ring with rotation of the bead ring, comprising:

a rotatably supported bead ring holding device for holding the bead ring;

a guide device for guiding the bead apex against the peripheral surface of the bead ring;

a cutting device for cutting the bead apex to a predetermined length when the leading end of the bead apex rotates by a predetermined angle of rotation; and a first holding device having a catching unit for catching and retaining the tail end of the bead apex; wherein said bead ring holding device comprises a rotatably supported annular former adapted to support the bead ring on a periphery thereof and a second holding device supported by said annular former, wherein said second holding device has a catching unit for catching and restraining the leading end of the bead apex and maintaining its caught and restrained state during at least a period sufficient to allow uniform stretching of the bead apex.

10. A device for applying a bead apex to a bead ring as set forth in claim 9, wherein said first holding device is supported movably in at least a direction equal to the direction toward the peripheral surface of the bead ring held by said former.

11. A device for applying a bead apex to a bead ring, as set forth in claim 9, wherein said first holding device is supported movably in direction equal, parallel and transverse to the direction toward the peripheral surface of the bead ring held by said former and wherein said catching unit of said first holding device is for catching and restraining the leading end of the bead apex, drawing it to a position above the bead ring and pressing it against the peripheral surface of the bead ring, before the apex is applied to the peripheral surface of the bead ring, and wherein said first holding device is also for catching and restraining the tail end of the bead apex of the predetermined length, when the apex is cut in a predetermined length, and being drawn to a position on the bead ring with the rotation of bead ring and then clamped as catching and restraining the tail end of the bead apex after the apex is cut.

12. A device for applying a bead apex to a bead ring as set forth in claim 11, wherein the outer peripheral diameter of said former is changeable.

13. A device of applying a bead apex to a bead ring as set forth in claim 9, wherein said device further comprises a joint pressing device being supported by said pressing device and having a joint pressing unit movable in the direction toward the joint portion of both ends of the bead apex applied in annular fashion to the bead ring for pressing said joint portion.

14. A device of applying a bead apex to a bead ring as set forth in claim 10, wherein said device further comprises a joint pressing device being supported by said pressing device and having a joint pressing unit movable in the direction toward the joint portion of both ends of the bead apex applied in annular fashion to the bead ring for pressing said joint portion.

15. A device of applying a bead apex to a bead ring as set forth in claim 11, where said device further comprises a joint pressing device being supported by said pressing device and having a joint pressing unit movable in the direction toward the joint portion of both ends of the bead apex applied in annular fashion to the bead ring for pressing said joint portion.

16. A device of applying a bead apex to a bead ring as set forth in claim 9, wherein the outer peripheral diameter of said former is changeable.

17. A device of applying a bead apex to a bead ring as set forth in claim 10, wherein the outer peripheral diameter of said former is changeable.

18. A device of applying bead apex in annular fashion to the peripheral surface of a bead ring with rotation of the bead ring, comprising a rotatably supported annular former which can support a bead ring on its periphery, an apex guide device for guiding a bead apex drawn to a position above the bead ring supported by the former, a first holding device supported movably in at least a direction equal to the direction toward the peripheral surface of the bead ring held by the former and having a catching unit for catching and restraining the tail end of the bead apex of a predetermined length when the apex is cut to a predetermined length and being drawn to a position on the bead ring with rotation of the bead ring and then clamped as catching and restraining the tail end of the bead apex after the bead apex is cut, a second holding device supported by said former and having a catching unit for catching and restraining the leading end of the bead apex drawn to and pressed against the bead ring by said first holding device and maintaining the catching and restraining state for a period extending from the start of apex applying process, a bead apex pressing device having a bead apex pressing unit supported movably in the widthwise direction of the bead apex applied to the bead ring for pressing the bead apex against the peripheral surface of the bead ring with the rotation of bead ring, a cutting device having a cutter for cutting in a predetermined length the bead apex across its width when the leading end of the apex applied to the peripheral surface of the bead ring rotates by a predetermined angle of rotation, and a joint pressing device having a joint pressing unit supported movably in the direciton of the joint of batch leading and tail ends of the bead apex applied to the peripheral surface of the bead ring.

* * * * *